(12) United States Patent  (10) Patent No.: US 7,679,041 B2
Lia                              (45) Date of Patent:     Mar. 16, 2010

(54) ELECTRONIC IMAGING DEVICE WITH PHOTOSENSOR ARRAYS

(75) Inventor: Raymond A. Lia, Auburn, NY (US)

(73) Assignee: GE Inspection Technologies, LP, Lewistown, PA (US)

( * ) Notice: Subject to any disclaimer, the term of this patent is extended or adjusted under 35 U.S.C. 154(b) by 83 days.

(21) Appl. No.: 11/646,678

(22) Filed: Dec. 28, 2006

(65) Prior Publication Data

US 2007/0187574 A1    Aug. 16, 2007

Related U.S. Application Data

(60) Provisional application No. 60/773,095, filed on Feb. 13, 2006.

(51) Int. Cl.
  *H01L 27/00* (2006.01)
  *G01N 23/00* (2006.01)
  *G03H 1/00* (2006.01)

(52) U.S. Cl. .................. 250/208.1; 250/307; 359/2

(58) Field of Classification Search ............. 250/208.1, 250/201.1, 201.2, 201.4, 559.05, 206, 216, 250/227.29, 227.2, 307, 311; 356/3.07, 222; 385/116, 117; 359/15, 22, 24, 2, 242, 292; 348/742, 771, 745, 757, 779, 780; 257/434, 257/435

See application file for complete search history.

(56) References Cited

U.S. PATENT DOCUMENTS

| 4,700,693 A | 10/1987 | Lia et al. |
| 4,727,859 A | 3/1988 | Lia |
| 4,733,937 A | 3/1988 | Lia et al. |
| 4,735,501 A | 4/1988 | Ginsburgh et al. |
| 4,786,934 A | 11/1988 | Kunze et al. |
| 4,787,369 A | 11/1988 | Allred, III et al. |
| 4,790,294 A | 12/1988 | Allred, III et al. |
| 4,794,912 A | 1/1989 | Lia |
| 4,796,607 A | 1/1989 | Allred, III et al. |
| 4,853,774 A | 8/1989 | Danna et al. |
| 4,862,253 A | 8/1989 | English et al. |
| 4,887,154 A | 12/1989 | Wawro et al. |
| 4,909,600 A | 3/1990 | Ciarlei et al. |
| 4,913,369 A | 4/1990 | Lia et al. |
| 4,941,454 A | 7/1990 | Wood et al. |

(Continued)

FOREIGN PATENT DOCUMENTS

JP    8153865    6/1996

(Continued)

OTHER PUBLICATIONS

European Search Report for Application No. 07101792.5-2202, dated Jun. 12, 2007 (6 pgs.).

(Continued)

*Primary Examiner*—Georgia Y Epps
*Assistant Examiner*—Don Williams
(74) *Attorney, Agent, or Firm*—GE Global Patent Operation

(57) ABSTRACT

An electronic imaging device is provided that includes a plurality of sensor elements, such as multiple photosensor arrays, wherein some of the sensor elements have a different numerical aperture value than the others, and wherein the sensor elements can be arranged such that their electrical signals can be combined to produce a composite electrical signal.

24 Claims, 6 Drawing Sheets

U.S. PATENT DOCUMENTS

| | | | |
|---|---|---|---|
| 4,941,456 A | 7/1990 | Wood et al. | |
| 4,962,751 A | 10/1990 | Krauter | |
| 4,980,763 A | 12/1990 | Lia | |
| 4,989,581 A | 2/1991 | Tamburrino et al. | |
| 4,998,182 A | 3/1991 | Krauter et al. | |
| 5,014,515 A | 5/1991 | Krauter | |
| 5,014,600 A | 5/1991 | Krauter et al. | |
| 5,018,436 A | 5/1991 | Evangelista et al. | |
| 5,018,506 A | 5/1991 | Danna et al. | |
| 5,019,121 A | 5/1991 | Krauter | |
| 5,047,848 A | 9/1991 | Krauter | |
| 5,052,803 A | 10/1991 | Krauter | |
| 5,061,995 A | 10/1991 | Lia et al. | |
| 5,066,122 A | 11/1991 | Krauter | |
| 5,070,401 A | 12/1991 | Salvati et al. | |
| 5,114,636 A | 5/1992 | Evangelista et al. | |
| 5,140,975 A | 8/1992 | Krauter | |
| 5,191,879 A | 3/1993 | Krauter | |
| 5,202,758 A | 4/1993 | Tamburrino | |
| 5,203,319 A | 4/1993 | Danna et al. | |
| 5,275,152 A | 1/1994 | Krauter et al. | |
| 5,278,642 A | 1/1994 | Danna et al. | |
| 5,299,275 A * | 3/1994 | Jackson et al. | 385/116 |
| 5,314,070 A | 5/1994 | Ciarlei | |
| 5,323,899 A | 6/1994 | Strom et al. | |
| 5,345,339 A | 9/1994 | Knieriem et al. | |
| 5,347,989 A | 9/1994 | Monroe et al. | |
| 5,365,331 A | 11/1994 | Tamburrino et al. | |
| 5,373,317 A | 12/1994 | Salvati et al. | |
| D358,471 S | 5/1995 | Cope et al. | |
| 5,435,296 A | 7/1995 | Vivenzio et al. | |
| 5,600,369 A | 2/1997 | Cazaux et al. | |
| 5,633,675 A | 5/1997 | Danna et al. | |
| 5,661,599 A | 8/1997 | Borner | |
| 5,686,960 A | 11/1997 | Sussman et al. | |
| 5,701,155 A * | 12/1997 | Wood et al. | 348/72 |
| 5,734,418 A | 3/1998 | Danna | |
| 5,754,313 A | 5/1998 | Pelchy et al. | |
| 5,857,963 A | 1/1999 | Pelchy et al. | |
| 5,900,982 A | 5/1999 | Dolgoff et al. | |
| 6,083,152 A | 7/2000 | Strong | |
| 6,097,394 A | 8/2000 | Levoy et al. | |
| 6,097,848 A | 8/2000 | Salvati | |
| 6,163,336 A | 12/2000 | Richards | |
| 6,232,947 B1 | 5/2001 | Miyawaki et al. | |
| 6,320,618 B1 | 11/2001 | Aoyama et al. | |
| 6,393,144 B2 | 5/2002 | Rogina et al. | |
| 6,468,201 B1 | 10/2002 | Burdick | |
| 6,476,784 B2 | 11/2002 | Zavracky et al. | |
| 6,483,535 B1 | 11/2002 | Tamburrino et al. | |
| 6,494,739 B1 | 12/2002 | Vivenzio et al. | |
| 6,538,732 B1 | 3/2003 | Drost et al. | |
| 6,552,323 B2 | 4/2003 | Guidash et al. | |
| 6,555,854 B2 | 4/2003 | Huang et al. | |
| 6,590,470 B1 | 7/2003 | Burdick | |
| 6,830,054 B1 | 12/2004 | Ross-Kuehn | |
| 6,950,343 B2 | 9/2005 | Takahashi | |
| 7,134,993 B2 | 11/2006 | Lia et al. | |
| 7,170,677 B1 | 1/2007 | Bendall et al. | |
| 2004/0012711 A1 | 1/2004 | Tamaru et al. | |
| 2004/0183900 A1 | 9/2004 | Karpen et al. | |
| 2004/0215413 A1 | 10/2004 | Weldum et al. | |
| 2004/0257628 A1 * | 12/2004 | Mukawa | 359/15 |
| 2005/0050707 A1 | 3/2005 | Scott et al. | |
| 2005/0129108 A1 * | 6/2005 | Bendall et al. | 375/240.01 |
| 2005/0162643 A1 | 7/2005 | Karpen | |
| 2005/0165275 A1 | 7/2005 | Von Felten et al. | |
| 2005/0168571 A1 | 8/2005 | Lia et al. | |
| 2005/0281520 A1 | 12/2005 | Kehoskie et al. | |
| 2006/0050983 A1 | 3/2006 | Bendall et al. | |
| 2006/0072903 A1 | 4/2006 | Weldum et al. | |

FOREIGN PATENT DOCUMENTS

WO  WO-02082545 A1  10/2002

OTHER PUBLICATIONS

Fuji Photo Film U.S.A., Inc. Announces Fourth-Generation Super CCD Technology—Leading-edge digital camera device reaches new frontiers in film-like image, Jan. 22, 2003, 4 pages, Fujifilm Press Center—http://www.fujifilmusa.com/JSP/fuji/epartners/PRPrintableNewsDetail.jsp?DBID=NEWS_526484 (Apr. 30, 2007).

State Intellectual Property Office, P.R. China, Applicant GE Inspection Technologies, LP, Date of Issue: Jun. 5, 2009, Title: Electronic Imaging Device With Photosensor Arrays, First Office Action, 2 pgs.

* cited by examiner

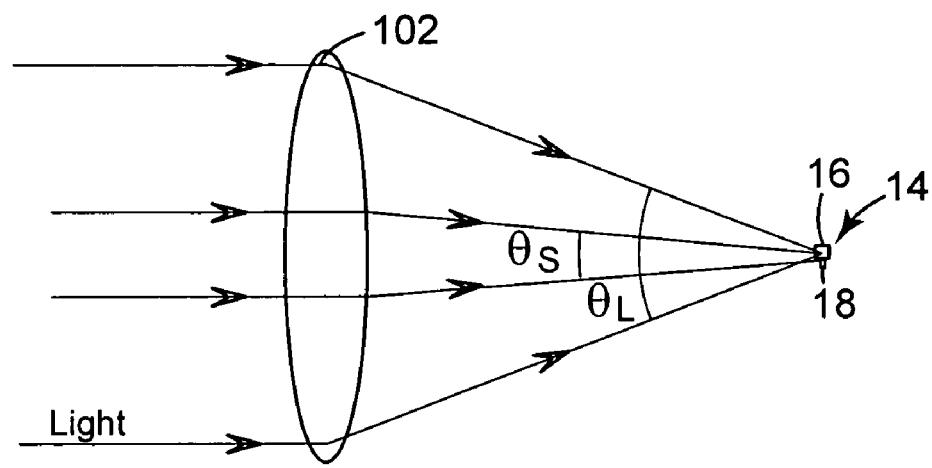
FIG. 1B
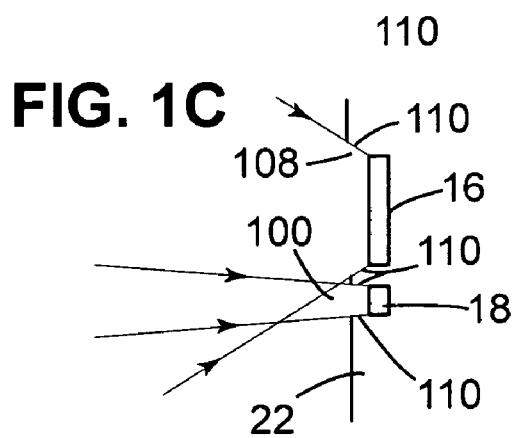
FIG. 1C
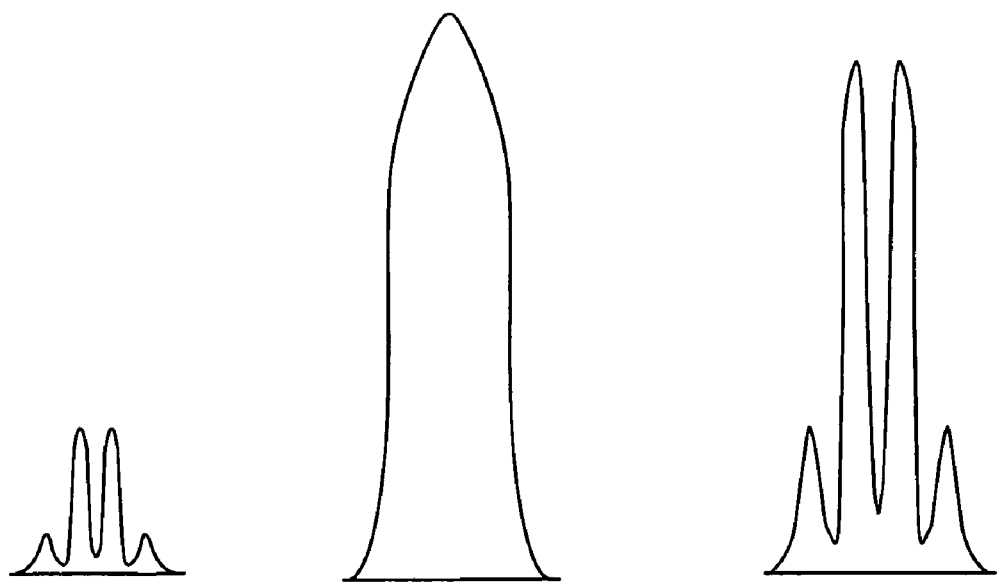
FIG. 3A  FIG. 3B  FIG. 3C

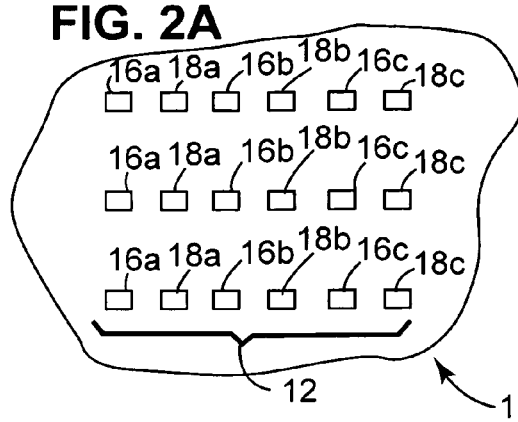
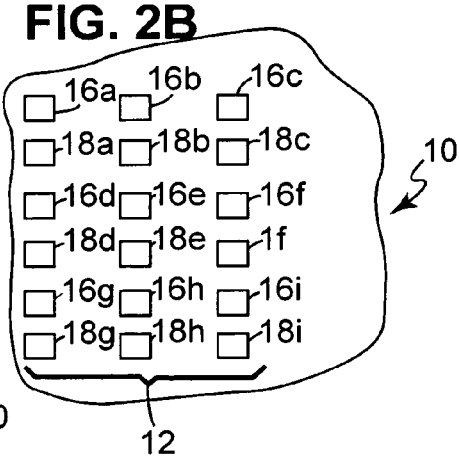
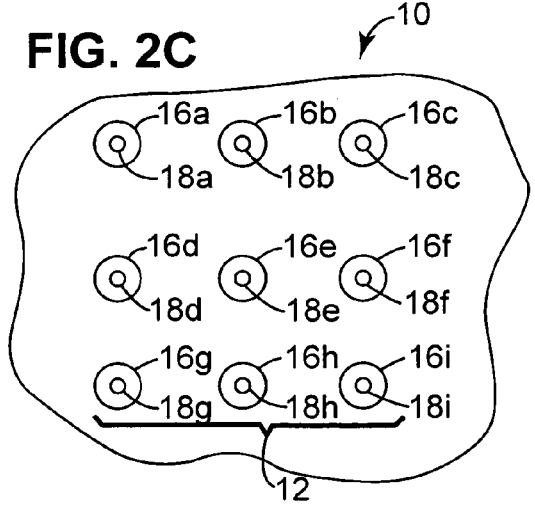
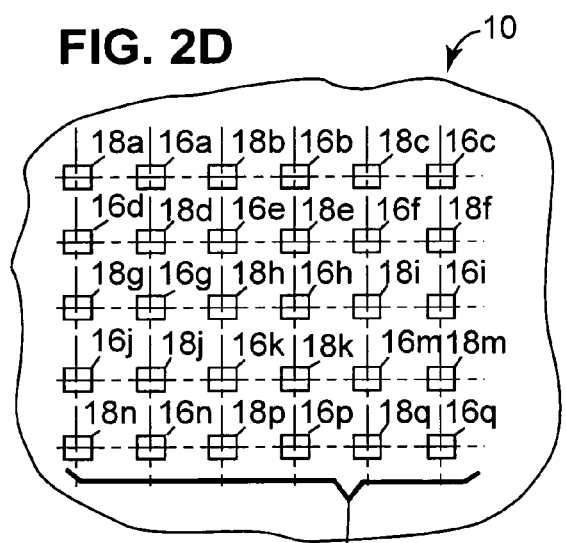
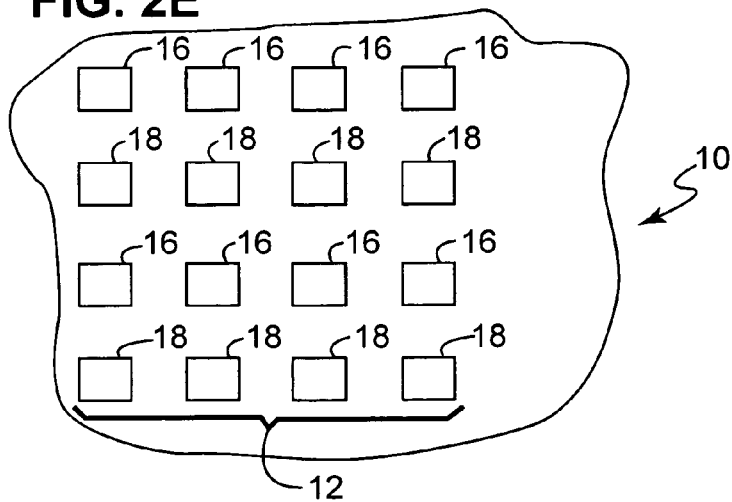

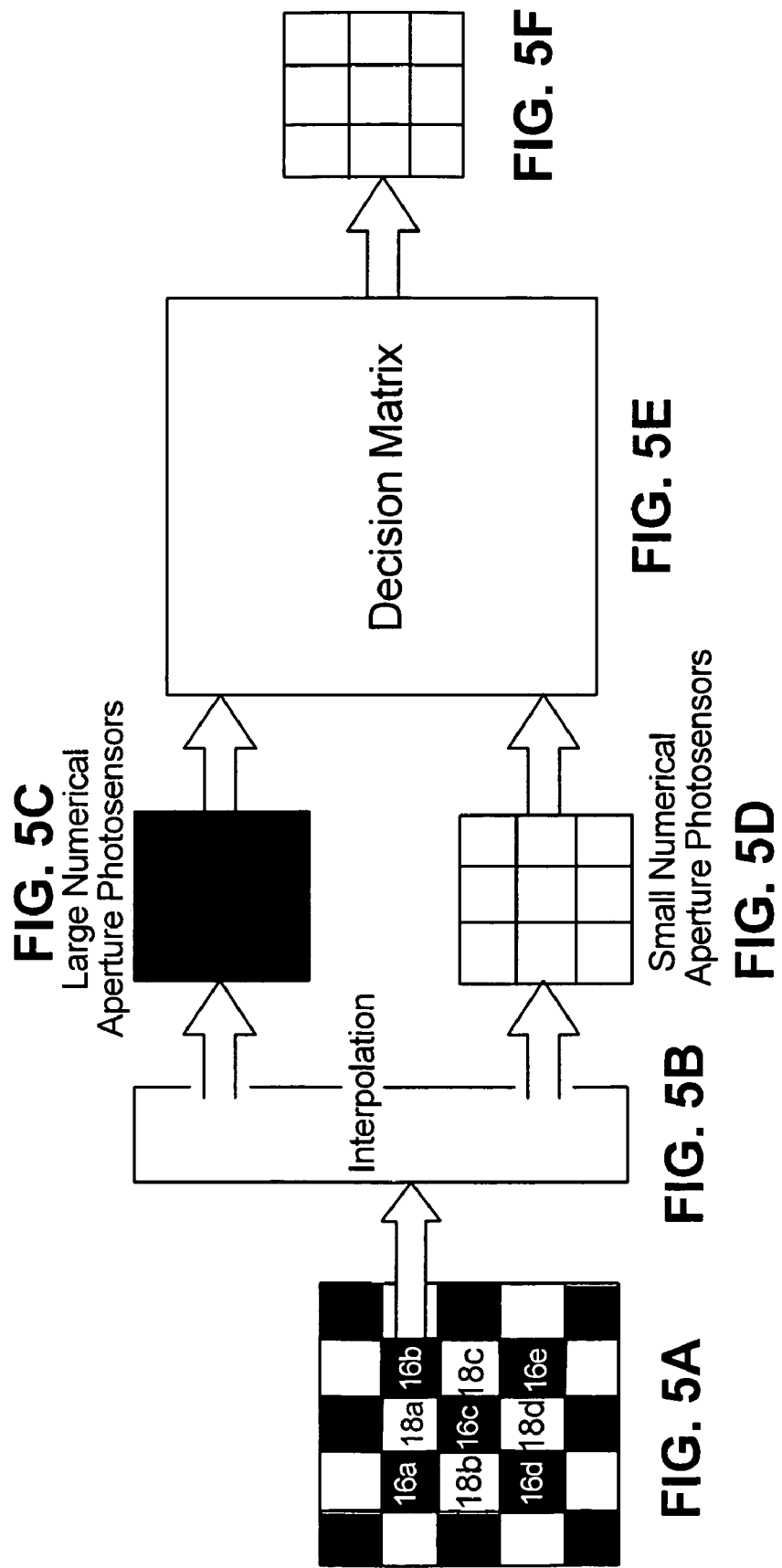

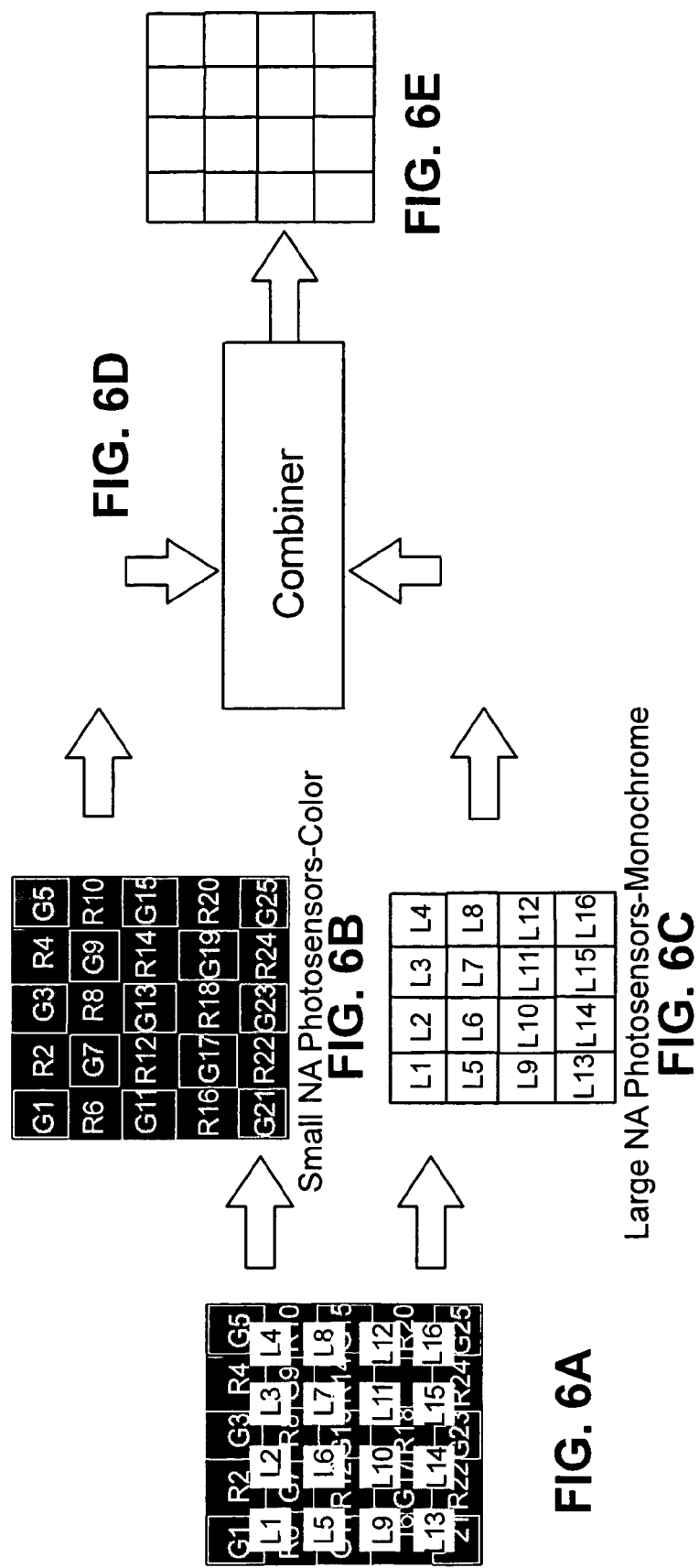

though these imagers to collect as much light as possible while still pro-
ELECTRONIC IMAGING DEVICE WITH PHOTOSENSOR ARRAYS

CROSS REFERENCE TO RELATED APPLICATIONS

This application claims priority from, and incorporates by reference the entirety of U.S. Provisional Patent Application Ser. No. 60/773,095, which was filed on Feb. 13, 2006.

FIELD OF THE INVENTION

The present invention relates generally to electronic imaging devices, and particularly to electronic imaging devices with multiple photosensor arrays.

BACKGROUND OF THE INVENTION

Traditional solid state imaging devices, such as those based on CCD (charge-coupled device) and CMOS (complementary metal oxide semiconductor) imaging devices, typically consist of a two-dimensional array of photosensors that are distributed on a surface or layer of a semiconductor chip, as well as an optical system used to focus an image (in the form of light passing through an aperture) onto the array. Each photosensor of the array commonly is generally referred to as a "picture element" or a "pixel." The amount of light energy reaching each photosensor is recorded and stored, and the output of the photosensors, in the aggregate, forms a captured image. Such imaging devices, or "imagers," can be configured to capture either gray scale images or color images. Color imagers are generally configured to have groupings of adjacent red, blue and green pixels forming the photosensor array.

It is generally desirable for the optical system of such imagers to collect as much light as possible while still providing the largest possible depth of field in the produced image. The phrase "depth of field," as used herein, refers to the areas of an image that remain in focus both in front (i.e., closer to the photosensor array) of, and behind the main focus point of the optical system. Depth of field can be affected by the aperture of the optical system and by the distance to the object being imaged, with a closer object producing a shallower depth of field, as well as with shorter focal lengths producing a greater depth of field.

An optical system's numerical aperture ("NA") is the controlling feature that governs the total amount of light available to the imager, and is generally defined as a ratio of an aperture of a lens of the optical system to the focal length of the lens. Mathematically speaking, the numerical aperture, NA, can be expressed as follows:

$$NA = \frac{1}{2}(d/f)$$

wherein d represents the diameter of the aperture opening and f is the focal length of the lens. In a digital imager, the focal length, f refers to the optical distance between the lens assembly and the surface of the photosensor array when a desired image is focused onto the array.

The depth of field of an imager and the brightness of an image captured by an imager are functions of NA and of the number of photosensors which provide the image's spatial resolution. These parameters are interrelated to effectively require a trade-off between the brightness of a captured image and the depth of field of the image. Put another way, in existing imagers, bright images are desirable (to illuminate visual details within the image); however, the brighter the image, the smaller the depth of field, and vice versa.

This trade-off is readily illustrated in, for example, a conventional CCD-type endoscope or borescope, where illumination is usually limited by environmental conditions, thus favoring a design with an aperture that is large enough to provide a usable amount of light and to impart brightness, but also small enough so that sufficient depth of field is provided for a specific application. Often times, such a compromise sacrifices the best of both worlds, resulting in a dim image with poor depth of field.

Another drawback associated with conventional imagers arises from the complex and delicate (usually mechanical) systems required to move the lens of the optical system and to change the light-admitting aperture of the optical system.

Thus, a need exists for an electronic imaging device that allows for the capture and display of images that are both bright and of a high depth of field.

SUMMARY OF THE INVENTION

These are other needs are met in accordance with an electronic imaging device, which, in one exemplary aspect, comprises a plurality of sensor elements, wherein a first predetermined number of the plurality of sensor elements has a first numerical aperture value and wherein a second predetermined number of the plurality of sensor elements has a second numerical aperture value, and wherein the first numerical aperture value is different than the second numerical aperture value. In accordance with this, and, if desired, other exemplary aspects, the plurality of sensor elements can be arranged such that each of the first predetermined number of the plurality of sensor elements is disposed proximate each of the second predetermined number of the plurality of sensor elements and/or wherein the first predetermined number of the plurality of sensor elements is equal to the second predetermined number of the plurality of sensor elements.

Also in accordance with this, and, if desired, other exemplary aspects, the plurality of sensor elements can be arranged in a grid-like array that has a plurality of rows and a plurality of columns. In one aspect, at least one of the plurality of rows can include only sensor elements selected from one of the group consisting of (a) the first predetermined number of the plurality of sensor elements, and (b) the second predetermined number of the plurality of sensor elements. Alternatively, at least one of the plurality of columns can include only sensor elements selected from one of the group consisting of (a) the first predetermined number of the plurality of sensor elements, and (b) the second predetermined number of the plurality of sensor elements. Moreover, and if also desired, at least one of the plurality of columns and at least one of the plurality of rows of the grid-like array can include both at least one of the first predetermined number of the plurality of sensor elements and at least one of the second predetermined number of the plurality of sensor elements, wherein, if further desired, there can be an equal total number of the first predetermined number of the plurality of sensor elements and the second predetermined number of the plurality of sensor elements in each row and/or in each column.

Still in accordance with at least an exemplary aspect in which the plurality of sensor elements can be arranged in a grid-like array that has a plurality of rows and a plurality of columns, each of at least some of the first predetermined number of the plurality of sensor elements is horizontally and vertically surrounded within the grid array by four other sensor elements, wherein at least two of the four other sensor elements are selected from the second predetermined number of the plurality of sensor elements. If desired, at least two of the four other sensor elements can be within the same row or the same column as the each of the at least some of the first predetermined number of the plurality of sensor elements. Moreover, each of at least some of the second predetermined number of the plurality of sensor elements can be horizontally and vertically surrounded within the grid array by four other sensor elements, wherein at least two of the four other sensor elements are selected from the first predetermined number of the plurality of sensor elements. If desired, at least two of the four other sensor elements can be within the same row or the same column as the each of the at least some of the second predetermined number of the plurality of sensor elements.

In accordance with another exemplary aspect, an electronic imaging device comprises (a) a first plurality of photosensitive elements, each of which has a first light acceptance angle, and (b) a second plurality of photosensitive elements, each of which has a second light acceptance numerical aperture. Each photosensitive element of the second plurality of photosensitive elements is disposed proximate to a respective photosensitive element of the first plurality of photosensitive elements thereby forming a plurality of dual photosensitive elements, and wherein the first light acceptance angle is different than the second light acceptance angle.

In accordance with still another exemplary aspect, an electronic imaging device comprises a plurality of photosensors, wherein each of the plurality of photosensors includes a plurality of photodetectors comprising (a) a first photodetector that has a first light acceptance numerical aperture, (b) a second photodetector that has a second light acceptance numerical aperture, wherein the second light acceptance numerical aperture is different than the first light acceptance numerical aperture, and (c) at least one additional photodetector (e.g., three or more additional photodetectors) At least one (e.g., each) of the at least one additional photodetector has a light acceptance numerical aperture that is different than the first light acceptance numerical aperture. Also, if desired, at least one of the plurality of photodetectors is monochromatic and at least one of the plurality of photodetectors is for color, such as, for example, two of the photodetectors are for color (e.g., different colors).

In accordance with a still yet another exemplary aspect, an imaging device, comprises (a) a lens, (b) a semiconductor device that is disposed proximate to a focal plane of the lens, wherein the semiconductor device includes a plurality of sensor elements, and (c) an image processor in communication with the semiconductor device. A first predetermined number of the plurality of sensor elements has a first numerical aperture value and a second predetermined number of the plurality of sensor elements has a second numerical aperture value, wherein the first numerical aperture value is different than the second numerical aperture value.

In accordance with a yet further exemplary aspect, an electronic imaging device has a focal plane and comprises (a) a first plurality of photosensors that are disposed in a first plane, wherein said first plane is substantially parallel with the focal plane, (b) a second plurality of photosensors that is disposed in the first plane, and (c) an aperture mask that is disposed proximate the first plurality of photosensors. The aperture mask defines a first plurality of openings and a second plurality of openings, wherein each of the first plurality of openings has a first area and each of the second plurality of openings has a second area. The first area is different than the second area, wherein each of the first plurality of openings is associated with a respective photosensor of the first plurality of photosensors; and wherein each of the second plurality of openings is associated with a respective photosensor of the second plurality of photosensors.

In accordance with this, and, if desired, other exemplary aspects, the second plurality of photosensors can include at least as many (e.g., two or more) photosensors as the first plurality of photosensors. Additionally or alternatively, each photosensor of the first plurality of photosensors has disposed proximate it at least one photosensor of the second plurality of photosensors, thereby forming a multi-photosensor imaging element. Still additionally or alternatively, each photosensor of the first plurality of photosensors generates a signal proportional to the amount of light incident on the each photosensor.

In accordance with a still yet further exemplary aspect, a video inspection device, comprises a display and an insertion tube. The insertion tube has an image sensor and a lens disposed at a distal end thereof, wherein the image sensor is in communication with the display and includes an electronic imager. The electronic imager includes a plurality of sensor elements, wherein a first predetermined number of the plurality of sensor elements has a first numerical aperture value and a second predetermined number of the plurality of sensor elements has a second numerical aperture value, and wherein the first numerical aperture value is different than the second numerical aperture value.

In accordance with a still yet even further aspect, a remote visual inspection device comprises a base module, a computation module, a demountable inspection module, an interconnection module, a power module, an unitary display module and control module, and an image sensor. The image sensor includes a plurality of sensor elements, wherein a first predetermined number of the plurality of sensor elements has a first numerical aperture value and a second predetermined number of the plurality of sensor elements has a second numerical aperture value, and wherein the first numerical aperture value is different than the second numerical aperture value.

Still other aspect and embodiments, and the advantages thereof, are discussed in detail below. Moreover, it is to be understood that both the foregoing general description and the following detailed description are merely illustrative examples, and are intended to provide an overview or framework for understanding the nature and character of the embodiments as they are claimed. The accompanying drawings are included to provide a further understanding of the various embodiments described herein, and are incorporated in and constitute a part of this specification.

BRIEF DESCRIPTION OF THE DRAWINGS

It is to be understood that both the foregoing general description and the following detailed description are merely illustrative examples, and are intended to provide an overview or framework for understanding the nature and character of the embodiments described herein. The accompanying drawings are included to provide a further understanding of such embodiments, and are incorporated in and constitute a part of this specification. The drawings illustrate various embodiments and, together with the description serve to explain the principles and operations of such embodiments.

FIG. 1B is a schematic representation of an alternative, yet still exemplary embodiment of the imaging device of FIG. 1A;

FIG. 1C is an enlarged, fragmentary view of the multi-element photosensor shown schematically in FIG. 1B;

FIGS. 2A-2E are enlarged fragmentary views of exemplary embodiments of an image sensor chip in accordance with the present application;

FIG. 3A is a graphical representation of the signals from a plurality of small numerical aperture photosensors in accordance with an exemplary embodiment of the present application;

FIG. 3B is a graphical representation of the signals from a plurality of large numerical aperture photosensors that are associated with the small numerical aperture photosensors whose signals are depicted in FIG. 3A;

FIG. 3C is a graphical representation, after processing, of the combination of the signals shown in FIG. 3A and FIG. 3B, wherein, it should be noted, the magnitude of 3A and 3B need not be the same;

FIGS. 5A-5F schematically illustrate an exemplary process for interpolating a two-dimensional grid-like array of large numerical aperture photosensors and a two-dimensional grid-like array of small numerical aperture photosensors in accordance with the present application; and FIGS. 6A-6E schematically illustrate an exemplary process for combining a two-dimensional grid-like array of large numerical aperture photosensors and a two-dimensional grid-like array of small numerical aperture photosensors in accordance with the present application.

DETAILED DESCRIPTION

Figure 1:
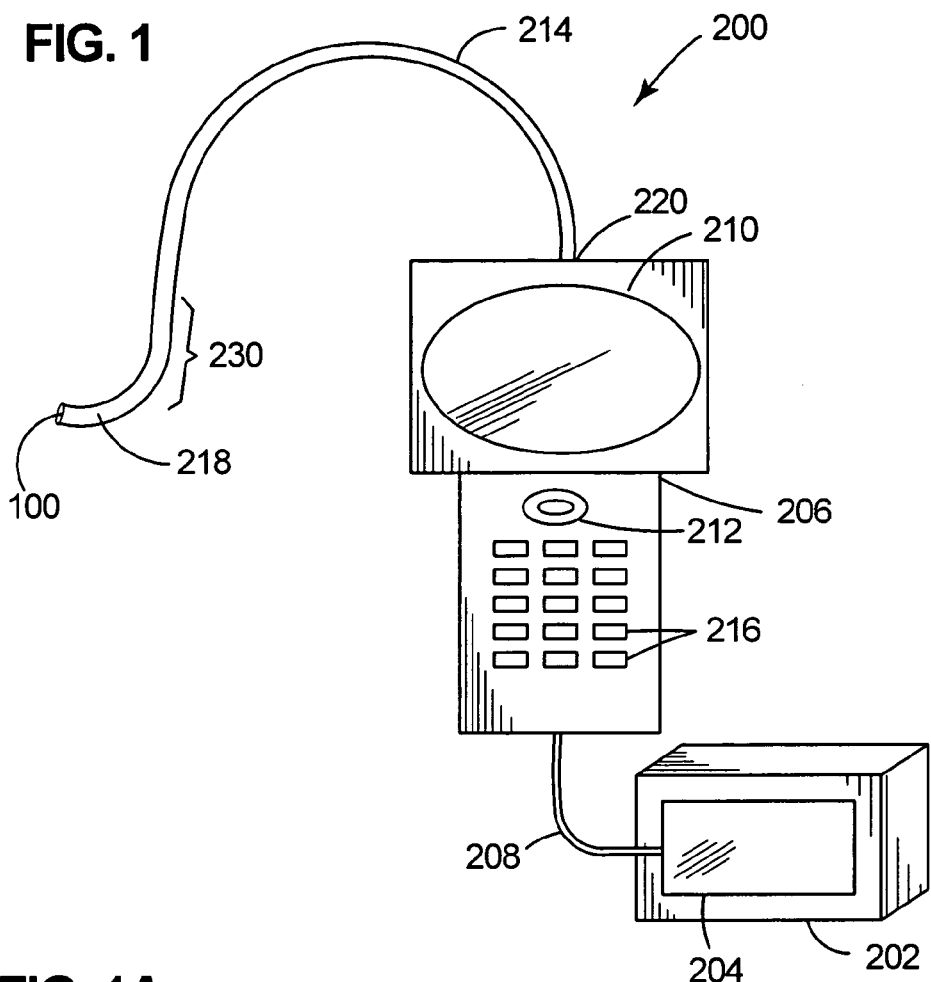
FIG. 1 is a video inspection device in accordance with an exemplary embodiment of the present application

It is to be understood that the present application is not limited to the details of construction and arrangements of components that are set forth herein in the detailed description of the preferred embodiment(s), and/or that which is illustrated in the drawings. The embodiments depicted and described herein are capable of being practiced and/or being carried out in various ways. Reference will now be made in detail to currently preferred and other embodiments, examples of which are illustrated in the accompanying drawings. Whenever possible, the same reference numerals will be used throughout the drawings to refer to the same or like parts for clarity.

Referring to FIG. 1, an exemplary video imaging inspection device 200 (a borescope in the illustrative embodiment) is illustrated of the type commercially available, for example, from GE Inspection Technologies of Flanders, N.J. Such a device 200 could include, as shown in the illustrated embodiment, a portable shipping/operating case 202 that includes a power supply 204 for the device and a light source (not shown), such as a metal halide arc lamp. The shipping/operating case 202 is shown in operative communication with a handpiece 206 by means of a cable 208. The handpiece 206 can include, by way of example, an LCD monitor 210 (that displays images seen by the imaging device), a joystick control 212 (e.g., for articulating an articulation section 230 of the video imaging inspection device 200), and a button set 216 (e.g., for accessing measurement, digital, and measurement controls associated with the video imaging inspection device 200).

The handpiece 206 also is connected to an insertion tube 214, which terminates in a distal end 218. As used herein, the term "distal" shall mean "in the direction of the tip of the borescope, furthest from the handpiece 206." The insertion tube 220 can be sized according to the desired application, such as by varying a diameter and a length of the insertion tube 214. The interior of the insertion tube 214 (not shown) can include standard imager lines and communication/control means, such as fiber-optic cables and articulation wires.

The distal end 218 of the insertion tube 214 of the video imaging inspection device 200 includes an image sensor 100. Although not shown, the image sensor 100 generally includes component such as a lens system and a imaging chip.

Figure 1A:
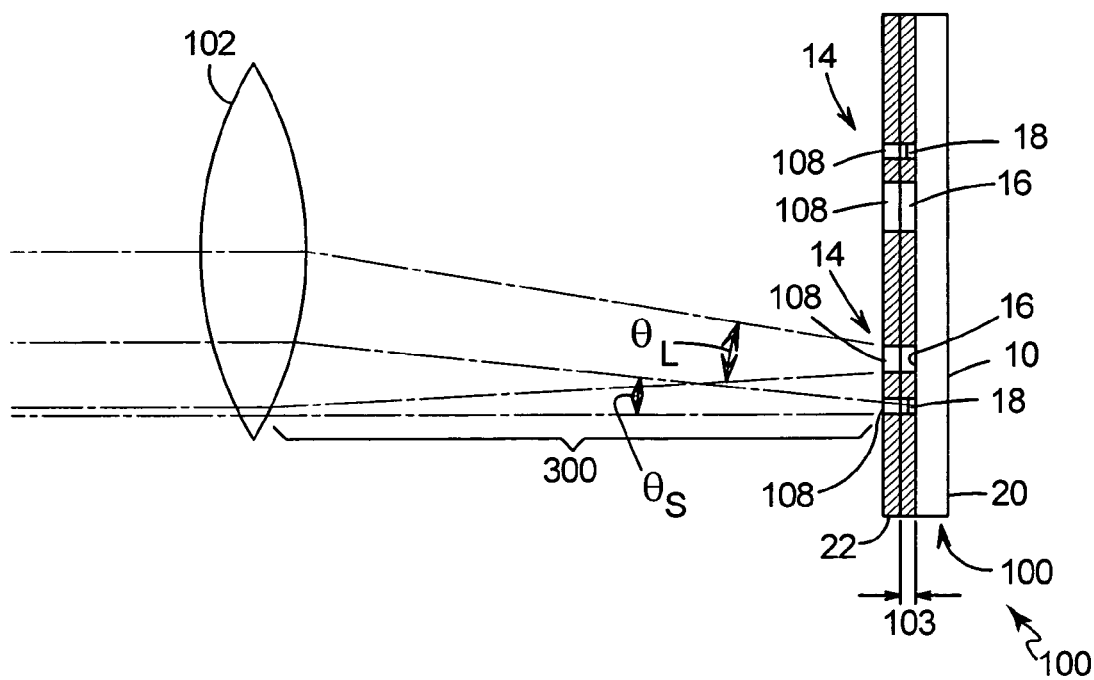
FIG. 1A is schematic representation of an imaging device in accordance with an exemplary embodiment of the present application.

Referring now to FIG. 1A, there is shown a schematic representation of an exemplary imaging device 300 in accordance with the present application. Additional detail regarding the imaging device 300 is disclosed in commonly owned U.S. patent application Ser. No. 10/768,761 filed Jan. 29, 2004, the entirety of which is hereby incorporated by reference. The exemplary imaging device 300 includes a lens 102 and an image sensor 100, each disposed along an imaging or optical axis. The lens 102 is configured to focus parallel rays of light onto a focal plane 103, thereby allowing an image to be focused onto the image sensor 100.

The image sensor 100 includes a photosensitive chip 10 that includes an array of multi-element photosensors 16, 18 disposed on a substrate 20. Each of the plurality of multi-element photosensors 16, 18 is disposed at or near the focal plane 103 of the lens 102 and includes at least one large numerical aperture photosensor 16 and at least one small numerical aperture photo sensor 18. The term, "numerical aperture," as used herein, is defined as the sine of the vertex angle of the largest cone of meridional rays that can enter or leave an optical system or element, multiplied by the refractive index of the medium in which the vertex of the cone is located. As used herein, the terms "large numerical aperture photosensor" and "small numerical aperture photosensor" are comparative reference terms, that is to say a large numerical aperture photosensor is a photosensor that has a greater numerical aperture, or light acceptance angle, than a small numerical aperture photosensor. If desired, and depending upon the specific requirements of the device 300, both the large numerical aperture photosensors 16 and the small numerical aperture photosensors 18 could have what are conventionally considered large or small numerical apertures.

The photosensitive chip 10 can further include an aperture mask layer 22, which may be, for example, a layer of opaque material that is deposited using conventional semiconductor chip manufacturing technologies. Openings 108 can be defined within the mask layer 22 or can be made using conventional photolithographic and etching techniques.

As shown in FIG. 1A, the size of the large numerical aperture photosensors 16 and the associated opening 108 in the aperture mask layer 22 work together to define the light acceptance angle, $\theta_L$, for the large numerical aperture photosensor(s). Similarly, the size of the small numerical aperture photosensors 18 and the associated opening 108 in the aperture mask layer 22 work together to define the light acceptance angle, $\theta_S$, for the small numerical aperture photosensor(s).

FIG. 1B depicts an exemplary embodiment in which the multi-element photosensor 16, 18 includes a large numerical aperture photosensor 18 and a small numerical aperture photosensor 18, and wherein the large numerical aperture photosensor 16 and its associated small numerical aperture photosensor 18 are positioned such that the vertices of their respective light acceptance angles ($\theta_L$, $\theta_S$) are as close to coincident as possible. Such a placement allows the converging cone of light received by the small numerical aperture photosensor 18 to be substantially centered within the converging cone of light received by the large numerical aperture photosensor 16. This arrangement allows for what is believed to be the clearest or best resolution image to be captured because the same point of the target image is captured by both photosensors, thereby minimizing the blurring of the image.

FIG. 1C shows an enlarged schematic cross sectional view of the multi-element photosensor 16, 18 of FIG. 1B. In particular, the influence of the configuration of the openings 108 on the numerical aperture of the large and small numerical aperture photosensors 16, 18 is shown. The walls 110 of the openings 108 in the aperture mask layer 22 can be sloped to approximate the respective light acceptance angles for each photosensor, thereby allowing the maximum amount of light to reach each photosensor 16, 18. The slope angles of the sides 110 depend upon optical characteristics, such as, for example, the focal length of the lens 102.

If desired, however, it is possible to arrange the large and small numerical aperture photosensors 16, 18 in such a manner that the converging cones of light only partially overlap. Furthermore, because each photosensor generates an electrical signal proportional to the light incident upon it and each of these signals is read and stored separately, the electrical signals can be combined using signal processing algorithms in any combination to achieve a desired effect in the resultant image.

Turning now to FIGS. 2A-2E, they are front plan views of various exemplary embodiments of the photosensitive chip 10. As shown, the chip 10 includes an "n×n" array 12 of multi-element photosensors, each of which includes at least one large numerical aperture photosensor 16 and at least one small numerical aperture photosensor 18. Each large numerical aperture photosensor 16 and each small numerical aperture photosensor 18 generates an individual electrical signal that is proportional to the intensity of light incident upon the respective photosensor. The two electrical signals from the large and small numerical aperture photosensors 16, 18 that make up the multi-element photosensor are combined using digital signal processing techniques (discussed below) to produce a composite electrical signal. The relative numerical apertures of the large numerical aperture pixels and the small numerical aperture pixels are chosen based upon the usage requirements of the imaging device 300. For example, in an exemplary borescope application, the large numerical aperture pixels may be designed to have an F number from about F1 to about F4, and the small numerical aperture pixels may be designed to have and F number from about F12 to about F25, wherein the ratio of the large numerical aperture to the small numerical aperture may be in the range from about 3 to about 25.

In the exemplary embodiment depicted in FIG. 2A, each multi-element photosensor 14 includes a single large numerical aperture photosensor 16 and a single small numerical aperture photosensor 18. Specifically, the large numerical aperture photosensors 16a, 16b, 16c, 16d, 16e, 16f, 16g, 16h, 16i are shown disposed in a two dimensional rectangular grid-like array having about a 5 μm periodicity. The small numerical aperture photosensors 18a, 18b, 18c, 18d, 18e, 18f, 18g, 18h, 18i are likewise disposed in a two dimensional grid-like array, wherein each of the small numerical aperture photosensors 18 is disposed proximate to an associated large numerical aperture photosensor 16. FIG. 2A shows the small numerical aperture photosensors 18a, 18b, 18c, 18d, 18e, 18f, 18g, 18h, 18i disposed in the same rows as their associated large numerical aperture photosensors 16a, 16b, 16c, 16d, 16e, 16f, 16g, 16h, 16i. It will be appreciated by those of ordinary skill in the art, however, that the relative placement of the large numerical aperture pixel 16 and its associated small numerical aperture pixel 18 are design choices that depend on such factors as the capabilities of the chip manufacturing process and/or the optical system with which the chip 10 is to be used.

Referring now to FIG. 2B, it shows another exemplary embodiment of the chip 10 in which each large numerical aperture photosensor 16 also has a small numerical aperture photosensor 18 disposed proximate to the large numerical aperture photosensor 16 with which it is associated. In this illustrated embodiment, however, the large numerical aperture photosensors are arranged in a two dimensional grid-like array 16a, 16b, 16c, 16d, 16e, 16f, 16g, 16h, 16i and the small numerical aperture photosensors 18a, 18b, 18c, 18d, 18e, 18f, 18g, 18h, 18i are disposed in two dimensional grid-like array in which rows of the large numerical aperture photosensors alternate with rows of small numerical aperture photosensors. Thus, the large numerical aperture photosensor 16 and its associated small numerical aperture photosensor 18 are disposed in the same column. An aperture mask layer 22 (shown in FIG. 1A) is applied to the chip 10 and is used in conjunction with the selected sizes of the photosensor elements to configure each photosensor element to have a desired numerical aperture.

In yet another exemplary embodiment of the chip 10, as shown in FIG. 2C, the large numerical aperture photosensors 16a, 16b, 16c, 16d, 16e, 16f, 16g, 16h, 16i also are arranged in a two dimensional grid-like array. In this instance, the large numerical aperture photosensors 16a, 16b, 16c, 16d, 16e, 16f, 16g, 16h, 16i are substantially annular in shape and the small numerical aperture photosensors 18a, 18b, 18c, 18d, 18e, 18f, 18g, 18h, 18i are sized to fit within the central opening of the annulus of the large numerical aperture photosensors 16a, 16b, 16c, 16d, 16e, 16f, 16g, 16h, 16i and are disposed within the boundaries of their associated large numerical aperture photosensors 16a, 16b, 16c, 16d, 16e, 16f, 16g, 16h, 16i. The small numerical aperture photosensors 18a, 18b, 18c, 18d, 18e, 18f, 18g, 18h, 18i may be of any shape, such as, for example, circular, hexagonal or rectangular, wherein the specific shape of the small numerical aperture photosensors 18 is a design choice depending upon a variety of factors, including, among other considerations, the chip manufacturing processes, the form factor of the large numerical aperture photosensor, and/or the design of the associated optical system. In one exemplary embodiment of the chip 10 arrangement shown in FIG. 2c, the annular photosensor and the central photosensor, while coincident with one another, are disposed at different distances from the lens 102. In another exemplary embodiment of FIG. 2c, the small numerical aperture photosensors 18a, 18b, 18c, 18d, 18e, 18f, 18g, 18h, 18i are substantially centered within the large numerical aperture photosensors 16a, 16b, 16c, 16d, 16e, 16f, 16g, 16h, 16i. In yet another exemplary embodiment of FIG. 2c, the centroids of the small numerical aperture photosensors 18a, 18b, 18c, 18d, 18e, 18f, 18g, 18h, 18i are not substantially collocated with the centroids of the large numerical aperture photosensors 16a, 16b, 16c, 16d, 16e, 16f, 16g, 16h, 16i.

It should be noted, however, that although the large numerical aperture photosensors 16 and the small numerical photosensors 18 have been depicted in FIG. 2A and FIG. 2B as rectangular elements and in FIG. 2C as circular elements, these geometric representations are merely for convenience in gaining an understanding of possible embodiments of the present application. It will be appreciated by those skilled in the art of designing photo sensitive chips that the geometric shape of each photosensor element is a unique design choice well within the capabilities of those of ordinary skill in the art and that the geometric shapes used to illustrate the accompanying figures are in no way a limitation of the present application.

In yet another exemplary embodiment, as shown in FIG. 2D, the chip 10 of the present application once again includes a first two-dimensional grid-like array of large numerical aperture photosensors 16a, 16b, 16c, 16d, 16e, 16f, 16g, 16h, 16i, 16j, 16k, 16m, 16n, 16p, 16q and a second two-dimensional grid-like array of small numerical aperture photosensors 18a, 18b, 18c, 18d, 18e, 18f, 18g, 18h, 18i, 18j, 18k, 18m, 18n, 18p, 18q. In this instance, however, the two arrays are disposed such that each element of an array is adjacent to four elements of the other array. In other words, the large and small numerical apertures alternate by both rows and columns. This configuration lends itself to very flexible post-image capture signal processing. Moreover, in this configuration each multi-element photosensor includes a single large numerical aperture photosensor 16, the electrical signal of which is combined with up to four small numerical aperture photosensor elements 18 associated with it, or, instead, a single small numerical aperture photosensor 18, the electrical signal of which may be combined with the electrical signals of up to the four adjacent large numerical aperture photosensors.

As will be appreciated by those skilled in the art, the FIG. 2D exemplary configuration of the chip 10 allows much flexibility in selecting which electrical signals from large numerical aperture photosensors 16 to combine with which electrical signals from the small numerical aperture photosensors. For example, in one exemplary embodiment of FIG. 2D, the chip 10 is configured to combine the electrical signals from small numerical aperture photosensors 18b, 18d, 18e and 18h with the electrical signal from large numerical aperture photosensor 16e and the electrical signals from small numerical aperture photosensors 18c, 18e, 18f and 18i with the electrical signal from large numerical aperture photosensor 16f. Thus, the electrical signal from a multiple small numerical aperture photosensor may be combined with the electrical signal from a single large numerical aperture photosensors.

Turning to FIG. 2E, an alternative embodiment of the image sensor chip 10 is shown. Here, the image sensor chip 10 includes a two-dimensional grid-like array of large numerical aperture photosensor elements 16, and a two-dimensional grid-like array of small numerical aperture photosensor elements 18 disposed on a substrate 20. Unlike previously discussed embodiments of FIGS. 2A-2D, in this embodiment, both the large and small numerical aperture photosensors 16, 18 have the same light receiving areas.

Figure 4A:
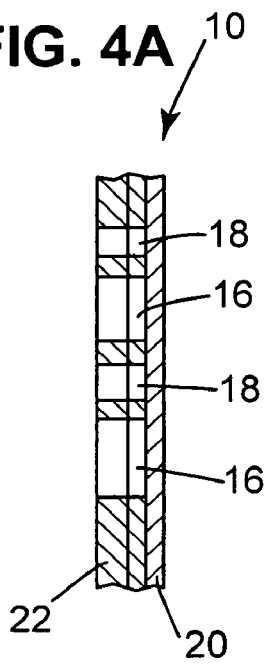
FIGS. 4A-4C are fragmentary cross sectional views of exemplary embodiments of an image sensor chip in accordance with the present application.
Figure 4B:
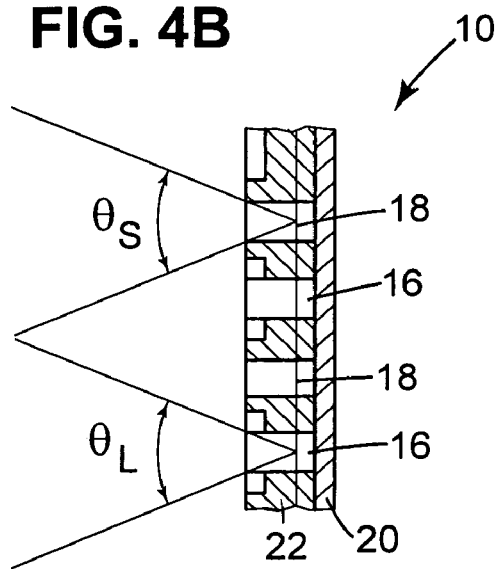
Figure 4C:
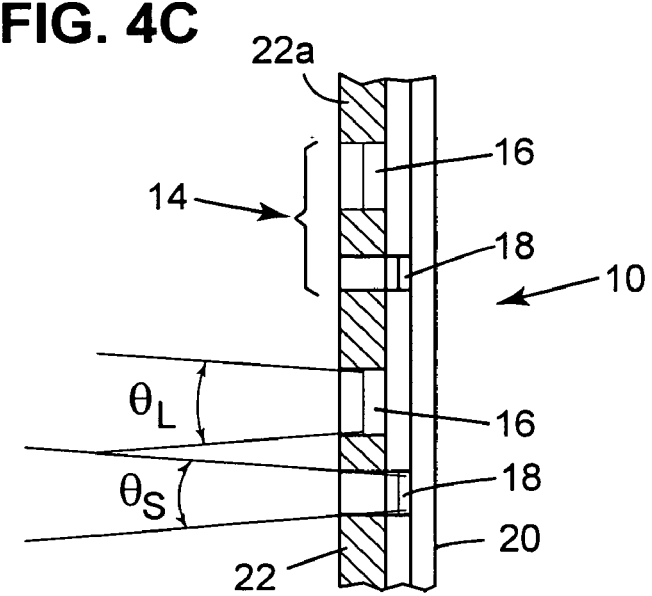

A better understanding of the FIG. 2E configuration of the image sensor chip 10 may be gained by reference to FIG. 4B. In accordance with the FIG. 2E exemplary embodiment, and as shown in FIG. 4B, the height of the mask layer 22 varies across the surface of the image sensing/sensor chip 10 and is used to set the numerical aperture for each photosensor. As also can be seen in FIG. 4B, the vertex angle $\theta_S$ for the small numerical aperture photosensors is less than the vertex angle $\theta_L$ for the large numerical aperture photosensors.

Referring now to FIGS. 5A-5F, an exemplary interpolation process is collectively shown. FIG. 5A depicts an exemplary chip 10 including a first two-dimensional grid-like array of large numerical aperture photosensors 16a, 16b, 16c, 16d, 16e and a second two-dimensional grid-like array of small numerical aperture photosensors 18a, 18b, 18c, 18d whereby the two arrays are disposed such that each element of an array is adjacent to four elements of the other array. In other words, the FIG. 5A exemplary arrangement is similar to that of FIG. 2D in that large and small numerical apertures alternate by both rows and columns.

In the FIG. 5A configuration, both the large numerical aperture photosensors 16 and the small numerical aperture photosensors 18 are monochromatic—to wit, configured to capture a gray scale image. As the chip 10 is read out, the small numerical aperture photosensor electrical signals are kept separate from the electrical signals of the large numerical aperture photosensors 16. These separated electrical signals are then subjected to an exemplary interpolation process, shown in FIG. 5B. This interpolation process is carried out in parallel for both the large numerical aperture electrical signals and the small numerical aperture electrical signals. In the case of the large numerical aperture photosensors 16a and 16b in FIG. 5A, the electrical signal derived from these photosensors has a discontinuity during the time period in which the small numerical aperture photosensor 18a is being read out. The interpolation processor in FIG. 5B calculates a suitable electrical signal value to replace this discontinuity. This replacement electrical signal is comprised of a combination of electrical signals from the four large numerical aperture photosensors adjacent to the single small numerical aperture photosensor 18a. Similarly, in the case of the small numerical aperture photosensors 18b and 18c in FIG. 5A, the electrical signal derived from these photosensors has a discontinuity during the time period in which the large numerical aperture photosensor 16c is being read out. The interpolation processor in FIG. 5B calculates a suitable electrical signal value to replace this discontinuity. This replacement electrical signal is comprised of a combination of electrical signals from the four small numerical aperture photosensors adjacent to the single large numerical aperture photosensor 16c. The output of the interpolation process is two parallel image arrays, one of large numerical aperture photosensors as shown in FIG. 5C and another of small numerical aperture photosensors as shown in FIG. 5D. These two parallel image arrays are input into a decision matrix as shown in FIG. 5E. For each element of the output image (shown in FIG. 5F), a decision is made between the high brightness of a large numerical aperture element from array FIG. 5C and the increased depth of field of a small numerical aperture element from array FIG. 5D. Thus the output image depicted in FIG. 5F is a combination of large and small numerical aperture elements. An example of this embodiment would be a scene with a well illuminated foreground and a dark background. The decision matrix (FIG. 5e) would select small numerical aperture elements to image the foreground and large numerical aperture elements for the darker background, thus rendering a composite image of better quality than one composed of a single numerical aperture which must trade off between the brightness of a captured image and the depth of field of the image.

It should be noted, however, that although this FIGS. 5A-5F exemplary embodiment utilized a 3×3 matrix, other size matrices may be used instead, such as to suit different imager sizes and/or different processing requirements.

Referring now to FIG. 6A-6E, they collectively depict an exemplary combination process. FIG. 6A depicts an exemplary configuration of a chip 10 that includes a first two-dimensional grid-like array of large numerical aperture photosensors L1,L2,L4,L5 . . . , and a second two-dimensional grid-like array of small numerical aperture photosensors G1,R2,G3,R4,G5,B6,G7,B8,G9,B10 . . . . In this exemplary configuration, the large numerical aperture photosensors L are monochromatic—to wit, configured to capture a gray scale image, whereas the small numerical aperture photosensors G1,R2,G3,R4,G5,B6,G7,B8,G9,B10 . . . . are color—to wit, arranged in a industry standard Bayer pattern, to capture a color image. As the chip 10 is read out, the small numerical aperture color photosensor electrical signals are kept separate from the electrical signals of the large numerical aperture monochromatic photosensors. The output of FIG. 6A is two parallel image arrays, one a monochromatic array of large numerical aperture photosensors as shown in FIG. 6C and another of small numerical aperture photosensors as shown in FIG. 6B. These two parallel image arrays are input into a combiner, shown in FIG. 6D. For each element of the output image (shown in FIG. 6E), an element of the high brightness, monochromatic, large numerical aperture array depicted in FIG. 6C is combined with a color element from the small numerical aperture array depicted in FIG. 6B. The color elements in FIG. 6B are decoded in an industry standard Bayer decoder (not shown) before combination with the monochrome elements in FIG. 6C. Thus the output image (see FIG. 6e) is a combination of small aperture color and large aperture monochrome elements. In a well-illuminated scene, the color elements predominate and produce a high depth of field color image as an output image (see FIG. 6e), whereas in a dark scene, the output of the small numerical aperture color elements will diminish and the large numerical aperture monochrome elements will predominate, instead producing a bright, low depth of field image as an output image (see FIG. 6e). In this respect, the combination of small numerical aperture color and high numerical aperture monochrome elements mimic the rod and cone structure of the human eye. It should be noted that although this exemplary embodiment of FIGS. 6A-6E utilized a Bayer color encoding, other color encoding methods can be easily adopted without undue experimentation. Also, any or all of the depicted exemplary embodiments of FIGS. 6a-6e can be modified such that the large numerical aperture elements are color elements and the small numerical aperture elements are monochromatic elements. Moreover, in an alternative embodiment that is not shown, the numerical aperture of the photosensor elements is controlled by having an aperture mask layer 22 with a substantially uniform thickness, but having the large and small numerical aperture photosensors 16, 18 located on different levels or layers of the substrate 20 of the chip 10.

Additional understanding of the configuration of the image sensing chip 10 and the interrelationship between photosensor size and aperture mask layer thickness in determining the numerical aperture for a specific photosensor may be gained by turning to FIG. 4A, which shows a fragmentary cross sectional view of the exemplary image senor chip 10 depicted in FIG. 2A. As can be seen, the image sensor chip 10 includes a substrate 20 on which the large and small numerical aperture photosensors 16, 18 are disposed. In this exemplary embodiment, the large and small numerical aperture photosensors 16, 18 are of two different sizes, with the large numerical aperture photosensors 16 having a larger size than the small numerical aperture photosensors 18. The image sensor chip 10 further includes an aperture mask layer 22. The aperture mask layer 22 is deposited on the substrate 20 and etched using conventional photolithography techniques to expose the large and small numerical aperture photosensor arrays. The thickness of the aperture mask layer 22 is chosen in conjunction with the size of the photosensors 16, 18 to provide the desired numerical aperture for a large and small numerical aperture photosensors 16, 18.

FIG. 3A shows a representative electrical signal from several of the small numerical aperture pixels, such as, for example, a row or column, or a partial row or partial column of the small numerical aperture pixels. The small numerical aperture pixels provide a high resolution image signal. This could be a black and white image signal, for example.

FIG. 3B shows a representative electrical signal from the corresponding large numerical aperture pixels of the same row or column or partial row or column shown in FIG. 3a. In contrast to the small numerical aperture pixels, the large numerical aperture pixels produce a signal that has a relatively lower resolution. This could be color information of lower resolution and different amplitude from that which is shown in FIG. 3A.

FIG. 3C shows a representative processed composite signal in which the electrical signals from the large numerical aperture pixels and their corresponding small numerical aperture pixels have been combined. The processed composite signal is an electrical signal having both large amplitude and high resolution. Thus, producing an image that is superior in depth of field to an image captured using a conventional CCD image sensor. The processed composite signal may then be stored in a memory device, such as a hard drive, removable optical or magnetic media, etc., for later display or sent to a display for immediate viewing.

It will be readily apparent to those skilled in the art of signal processing that many different methods may be used to combine the electrical signals from the large numerical aperture pixels and their associated small numerical pixel or pixels in order to obtain an image having the desired degrees of brightness and resolution. Suitable methods include the use of signal-to-noise subtraction techniques, image stitching algorithms, interpolation techniques, gain balancing and smoothing techniques, among others, to combine the electrical signals from the large and small numerical aperture photosensors and to process these signals to achieve a bright large depth of field imaging system without the aid of moving lenses or varying aperture stops. The use of these techniques is well understood by those of ordinary skill in the art of digital image processing.

Although not shown specifically in the drawings, the various embodiments described and depicted herein can be utilized in connection with devices and arrangements other than video inspection devices. Such other devices can include, but are not limited to a telecommunications device (e.g., a cellular telephone, PDA or other like device that includes camera functionality), a digital camera, and a camcorder device.

By way of non-limiting example, a telecommunications device can comprise a wireless transceiver and an image sensor, wherein the image sensor can include a plurality of photosensors. By way of an additional, yet still non-limiting example, a digital camera can comprise an image sensor that includes a plurality of photosensors. In each instance, and also by way of non-limiting example, each photosensor can include a first photodetector that has a first light acceptance numerical aperture and a second photodetector that has a second light acceptance numerical aperture. The second light acceptance numerical aperture can be different (e.g., smaller) than the first light acceptance numerical aperture, wherein the electrical signal from the first photodetector and the electrical signal from the second photo detector can be combined to produce an image having a depth of field greater than that of an image constructed using only the electrical signals of the first photodetector.

Equivalents

Although various embodiments have been described herein, it is not intended that such embodiments be regarded as limiting the scope of the disclosure, except as and to the extent that they are included in the following claims—that is, the foregoing description is merely illustrative, and it should be understood that variations and modifications can be effected without departing from the scope or spirit of the various embodiments as set forth in the following claims.

Moreover, any document(s) mentioned herein are incorporated by reference in its/their entirety, as are any other documents that are referenced within such document(s).

What is claimed is:

1. An electronic imaging device for capturing an image, comprising:
   a first plurality of sensor elements that output signals based on the amount of light received by each of said sensor elements in said first plurality of sensor elements;
   a second plurality of sensor elements that output signals based on the amount of light received by each of said sensor elements in said second plurality of sensor elements; and
   an aperture mask layer disposed proximate said first and second plurality of sensor elements, wherein said aperture mask layer defines a first plurality of openings and a second plurality of openings, and wherein each opening in said first plurality of openings has a first area and each opening in said second plurality of openings has a second area, and wherein said first area is different than said second area;
   wherein said first plurality of openings limit the amount of light that can be received by each of said sensor elements in said first plurality of sensor elements forming a first light acceptance angle for each of said sensor elements in said first plurality of sensor elements, and said second plurality of openings limit the amount of light that can be received by each of said sensor elements in said second plurality of sensor elements forming a second light acceptance angle for each of said sensor elements in said second plurality of sensor elements; and
   wherein said signals from said first plurality of sensor elements are combined with said signals from said second plurality of sensor elements to produce a composite image.

2. The electronic imaging device of claim 1, wherein said first and second plurality of sensor elements are arranged such that each of said first plurality of sensor elements is disposed proximate each of said second plurality of sensor elements.

3. The electronic imaging device of claim 1, wherein the number of said first plurality of sensor elements is equal to the number of said second plurality of sensor elements.

4. The electronic imaging device of claim 1, wherein said first and second plurality of sensor elements are arranged in a grid-like array having a plurality of rows and a plurality of columns.

5. The electronic imaging device of claim 4, wherein at least one of said plurality of rows includes only sensor elements selected from one of the group consisting of (a) said first-plurality of sensor elements, and (b) said second-plurality of sensor elements.

6. The electronic imaging device of claim 4, wherein at least one of said plurality of columns includes only sensor elements selected from one of the group consisting of (a) said first-plurality of sensor elements, and (b) said second plurality of sensor elements.

7. The electronic imaging device of claim 4, wherein at least one of said plurality of columns and at least one of said plurality of rows includes both at least one of said first plurality of sensor elements and at least one of said second plurality of sensor elements.

8. The electronic imaging device of claim 7, wherein at least one of said plurality of rows includes an equal number of said first plurality of sensor elements and said second plurality of sensor elements.

9. The electronic imaging device of claim 7, wherein at least one of said plurality of columns includes an equal number of said first plurality of sensor elements and said second plurality of sensor elements.

10. The electronic imaging device of claim 4, wherein each of at least some of said first plurality of sensor elements is horizontally and vertically surrounded within said grid-like array by four other sensor elements, and wherein at least two of said four other sensor elements are selected from said second plurality of sensor elements.

11. The electronic imaging device of claim 10, wherein said at least two of said four other sensor elements are within the same row as said each of at least some of said first plurality of sensor elements.

12. The electronic imaging device of claim 10, wherein said at least two of said four other sensor elements are within the same column as said each of at least some of said first plurality of sensor elements.

13. The electronic imaging device of claim 4, wherein each of at least some of said second plurality of sensor elements is horizontally and vertically surrounded within said grid-like array by four other sensor elements, and wherein at least two of said four other sensor elements are selected from said first plurality of sensor elements.

14. The electronic imaging device of claim 13, wherein said at least two of said four other sensor elements are within the same row as said each of at least some of said second plurality of sensor elements.

15. The electronic imaging device of claim 13, wherein said at least two of said four other sensor elements are within the same column as said each of at least some of said second plurality of sensor elements.

16. The electronic imaging device of claim 1, wherein at least one of said first and second plurality of sensor elements is monochromatic and at least one of said first and second plurality of sensor elements is for color.

17. The electronic imaging device of claim 1, wherein at least two of said first and second plurality of sensor elements are for color.

18. The electronic imaging device of claim 1, wherein at least two of said first and second plurality of sensor elements are for different colors.

19. The electronic imaging device of claim 1, wherein said second plurality of sensor elements includes at least as many sensor elements as said first plurality of sensor elements.

20. The electronic imaging device of claim 1, wherein each sensor element of said first plurality of sensor elements has disposed proximate it at least one sensor element of said second plurality of sensor elements, thereby forming a multi-sensor imaging element.

21. The electronic imaging device of claim 20, wherein said multi-sensor imaging element includes at least two sensor elements of said second plurality of sensor elements.

22. The electronic imaging device of claim 1, wherein each sensor element of said first and second plurality of sensor elements generates a signal proportional to the amount of light incident on said sensor element.

23. A video inspection device for capturing an image, comprising:
   a display; and
   an insertion tube having an image sensor and a lens disposed at a distal end thereof, wherein said image sensor is in communication with said display and includes an electronic imager;
   wherein said electronic imager includes a first plurality of sensor elements that output signals based on the amount of light received by each of said sensor elements in said first plurality of sensor elements, a second plurality of sensor elements that output signals based on the amount of light received by each of said sensor elements in said second plurality of sensor elements, and an aperture mask layer disposed proximate said first and second plurality of sensor elements, wherein said aperture mask layer defines a first plurality of openings and a second plurality of openings, and wherein each opening in said first plurality of openings has a first area and each opening in said second plurality of openings has a second area, and wherein said first area is different than said second area, and wherein said first plurality of openings limit the amount of light that can be received by said sensor elements in said first plurality of sensor elements forming a first light acceptance angle for each of said sensor elements in said first plurality of sensor elements, and said second plurality of openings limit the amount of light that can be received by said sensor elements in said second plurality of sensor elements forming a second light acceptance angle for each of said sensor elements in said second plurality of sensor elements, and wherein said signals from said first plurality of sensor elements are combined with said signals from said second plurality of sensor elements to produce a composite image.

24. A remote visual inspection device for capturing an image, comprising:
- a base module;
- a computation module;
- a demountable inspection module;
- an interconnection module;
- a power module;
- a unitary display module and control module; and
- and an image sensor, wherein said image sensor includes a first plurality of sensor elements that output signals based on the amount of light received by each of said sensor elements in said first plurality of sensor elements, a second plurality of sensor elements that output signals based on the amount of light received by each of said sensor elements in said second plurality of sensor elements, and an aperture mask layer disposed proximate said first and second plurality of sensor elements, wherein said aperture mask layer defines a first plurality of openings and a second plurality of openings, and wherein each opening in said first plurality of openings has a first area and each opening in said second plurality of openings has a second area, and wherein said first area is different than said second area, and wherein said first plurality of openings limit the amount of light that can be received by said sensor elements in said first plurality of sensor elements forming a first light acceptance angle for each of said sensor elements in said first plurality of sensor elements, and said second plurality of openings limit the amount of light that can be received by said sensor elements in said second plurality of sensor elements forming a second light acceptance angle for each of said sensor elements in said second plurality of sensor elements, and wherein said signals from said first plurality of sensor elements are combined with said signals from said second plurality of sensor elements to produce a composite image.

* * * * *